Figure 1:
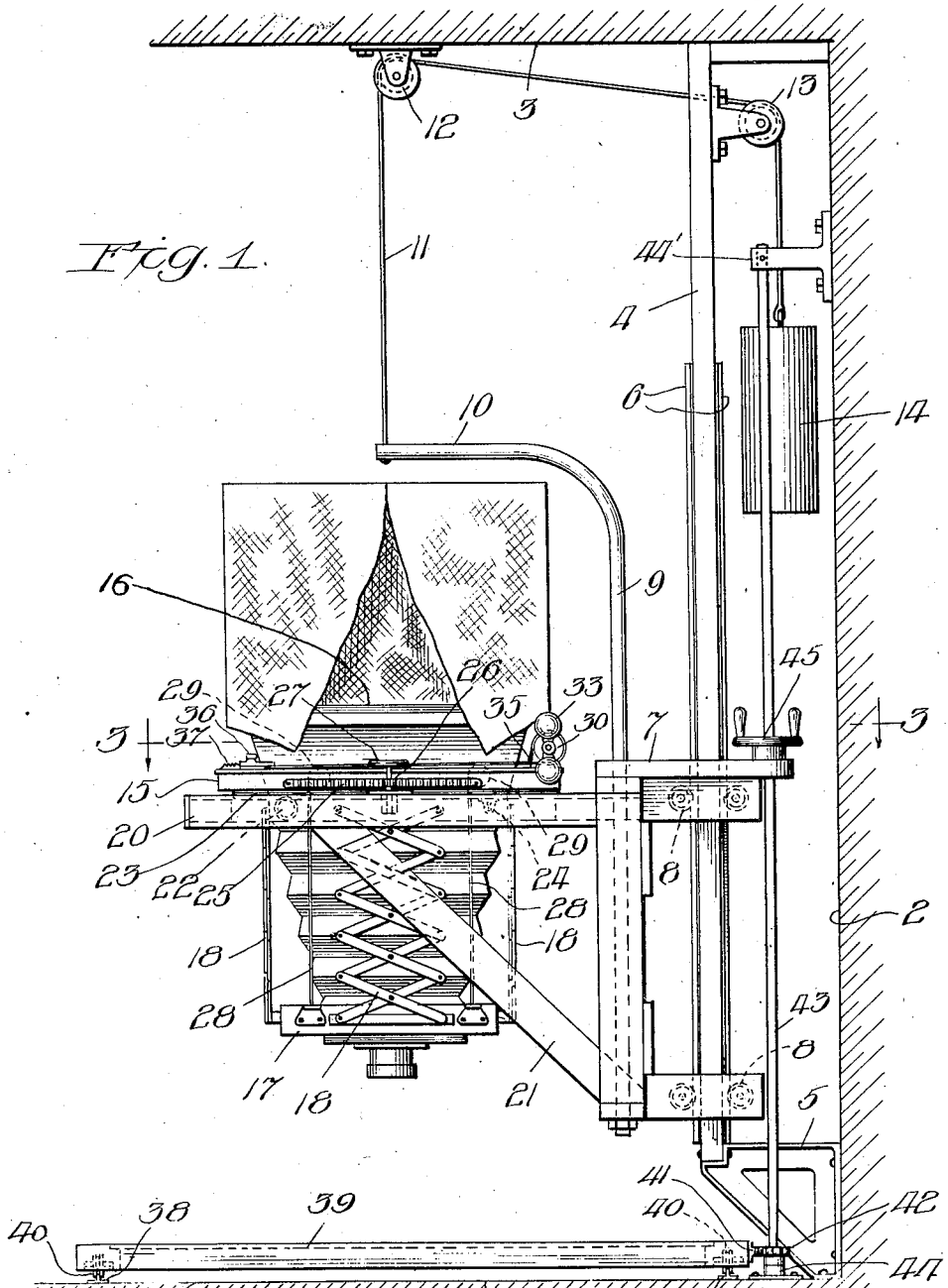

J. E. WEBSTER.
PHOTOGRAPHIC APPARATUS.
APPLICATION FILED NOV. 30, 1914.

1,170,028.

Patented Feb. 1, 1916.
3 SHEETS—SHEET 1.

Witnesses:
Harry S. Gaither
Ernest H. Merchant

Inventor
John E. Webster
by Wm. O. Bell
Atty

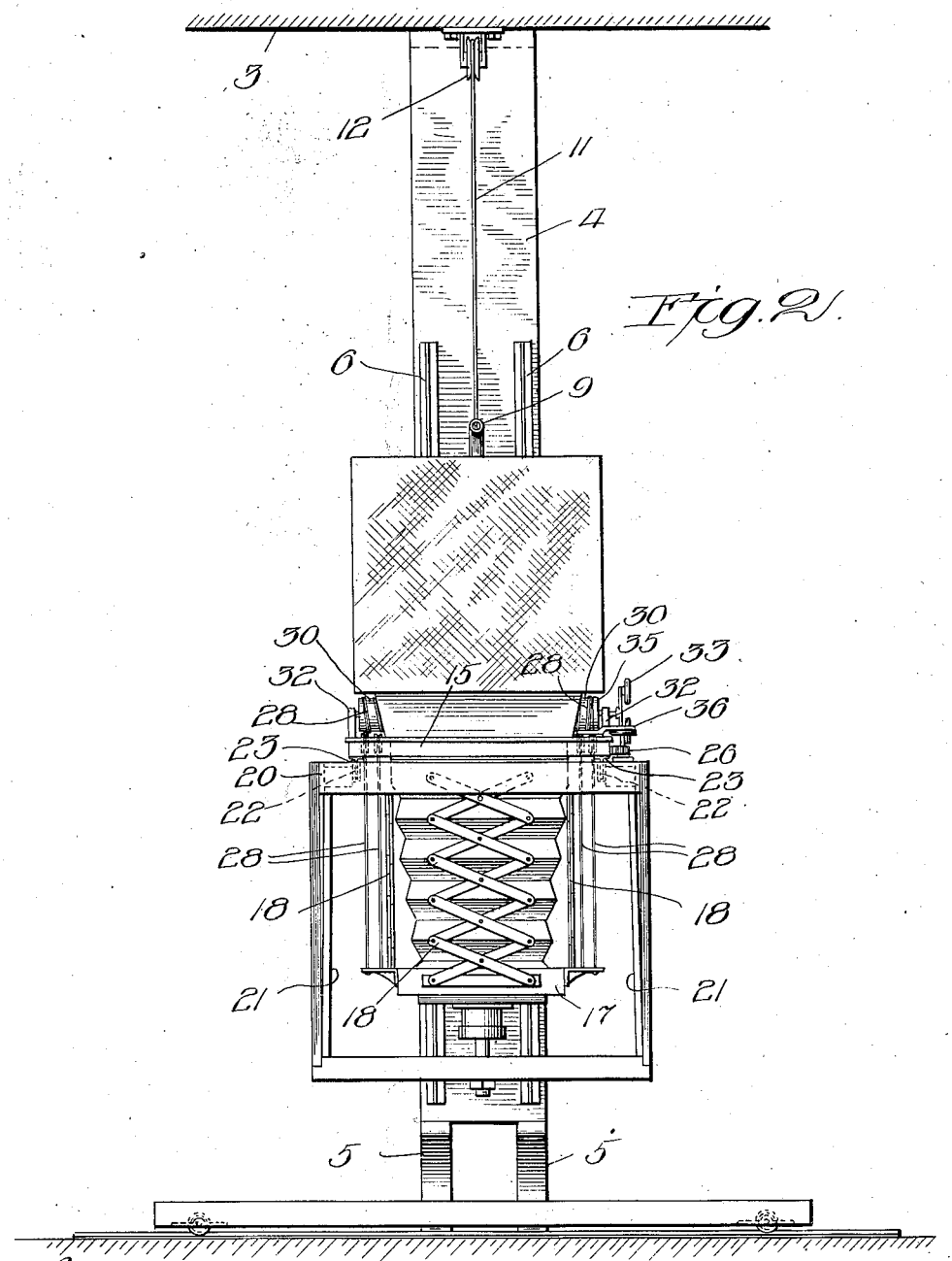

J. E. WEBSTER.
PHOTOGRAPHIC APPARATUS.
APPLICATION FILED NOV. 30, 1914.
1,170,028.
Patented Feb. 1, 1916.
3 SHEETS—SHEET 3.
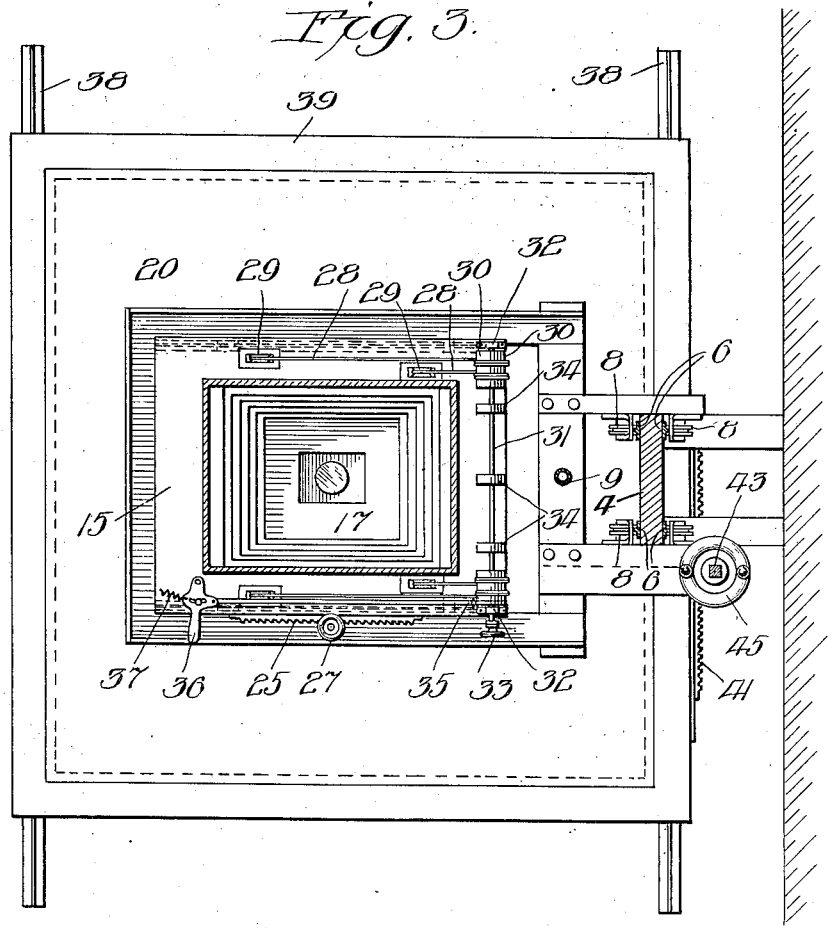
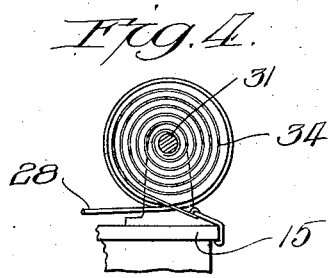

UNITED STATES PATENT OFFICE.

JOHN E. WEBSTER, OF CHICAGO, ILLINOIS.

PHOTOGRAPHIC APPARATUS.

1,170,028.  Specification of Letters Patent.  Patented Feb. 1, 1916.

Application filed November 30, 1914. Serial No. 874,645.

*To all whom it may concern:*

Be it known that I, JOHN E. WEBSTER, a citizen of the United States, residing at Chicago, in the county of Cook and State of Illinois, have invented certain new and useful Improvements in Photographic Apparatus, of which the following is a specification.

My invention relates in general to photographic apparatus and more specifically to a camera of the "shooting down" type.

In commercial photography it is frequently desirable to arrange the article or articles to be photographed on a level surface, whereby it becomes necessary to mount the camera above such surface and direct it downwardly thereupon. The cameras used in this class of work are necessarily large and unwieldy and considerable difficulty has been experienced in so arranging the camera and the article support that they may be readily manipulated by the operator to properly focus the camera while the operator is in a position to view the image on the focusing screen.

It is the object therefore of my invention to provide a camera of the "shooting down" type in which all adjusting devices are within easy reach of the operator, whereby he is enabled to make all necessary adjustments to obtain a perfect image without moving from the image-observing position.

Other objects and advantages of my invention will be apparent as it is better understood by reference to the following specification in connection with the accompanying drawings in which—

Figure 1 is a side elevation of my invention; Fig. 2 is a front elevation thereof; Fig. 3 is a horizontal section on the line 3—3 of Fig. 1, and Fig. 4 is a detail of the lens board balancing spring.

Referring to the drawings, 1, 2 and 3 designate the floor, wall and ceiling respectively, of a room, by which the various parts of my invention are supported, it being, of course, obvious that other supporting means may be substituted. Spaced from the wall 2 is an upright member 4 supported at its lower end on the brackets 5. The member 4 is provided with tracks 6 on either side thereof, forming a runway for the camera supporting frame 7 which is provided with rollers 8 to engage the tracks 6. The supporting frame 7 is further provided with an upright member 9 having a horizontal extension 10, the extremity of which is approximately disposed above the center of the camera and is connected, through a flexible supporting means 11 running over pulleys 12 and 13 secured to the ceiling 3 and the upright member 4, respectively, with a weight 14 which is adapted to balance the weight of the camera and its supporting frame.

The camera comprises a frame 15 provided at its upper end with a focusing screen 16 and at its lower end with a lens board 17. The lens board 17 is supported from a frame 15 at each of the four sides by means of lazy tongs 18 which keep the lens board in proper parallel relation with the frame as it is moved to and fro. A bellows 19 is also disposed between the lens board 17 and the frame 15 to prevent the entrance of light into the camera as the lens board 17 is moved to properly focus the camera.

The frame 15 is slidably supported on the horizontal members 20 of the camera supporting frame 7, bracket members 21 being provided on either side of the camera to rigidly hold the members 20 in horizontal position. The frame 15 is provided with tracks 23 which at its forward end run on rollers 22 secured to the horizontal members 20. At the rear end the tracks 23 slide on brackets 24 secured to the members 20. The frame is provided with a rack 25 and a pinion 26 is pivotally mounted on the horizontal members 20 to engage the rack 25. A hand wheel 27 is provided whereby the pinion 26 may be rotated to move the rack 25 to and fro along the horizontal members 20. By this arrangement it is possible to adjust the camera in a horizontal direction relative to the articles to be photographed, while at the same time the camera, when adjusted, will retain its position owing to the friction between the tracks 23 and the brackets 24.

It is a well known fact that to obtain a sharp image on the focusing screen it is preferable that the lens move rapidly to the proper point and it is the purpose of my invention to provide a simple means for attaining this result. The lens board 17 is connected through flexible members 28 running over pulleys 29 with the drums 30 of the shaft 31 mounted in suitable bearing members 32 on the frame 15. A plurality of springs 34 are secured at one end to the shaft 31 and at the other end to the frame 15 and counter-balance the weight of the lens board 17 and its supporting mechanism in order that the lens board may move upward rapidly when the device 33 is actuated.

A hand operating device 33 is connected with one end of the shaft 31 and it will be readily understood that when the operator turns the device 33 in either direction the drums 30 will cause, through the flexible members 28, a rapid movement of the lens board 17 toward or from the frame 15. A band brake 35 is secured to the frame 15 and disposed about one of the drums 30, its opposite end being secured to a hand lever 36 pivotally mounted on the frame 15 and normally held by the spring 37 in position to hold the brake 35 closely about the drum 30. By releasing the lever 36 the brake 35 is automatically set and the lens board 17 may thereby be instantly stopped when the image on the screen 16 is clearly defined.

Mounted on tracks 38 on the floor 1 is a screen 39 having rollers 40 coöperating with the tracks 38 and adapted to support the article or articles to be photographed. A rack 41 is disposed along one edge of the screen 39 and adapted to be engaged by the pinion 42 on an upright squared shaft 43 mounted in bearings 44 and 44' secured to the floor 1 and the wall 2 respectively. A hand wheel 45 is slidably mounted on the shaft 43 and is adapted to move vertically with the camera supporting frame 7, whereby the hand wheel 45 is always within easy reach of the operator. By turning the hand wheel 45 the pinion 42 is rotated and the screen 39 is moved horizontally in a direction at right angles to the movement of the camera frame 15 on the horizontal members 20.

It is thought that the operation of my device will be readily understood without further description. The article or articles to be photographed are arranged upon the screen 39 and the operator assumes the proper position to view the focusing screen 16. The camera frame 7 is then moved vertically on the tracks 6 to a position to obtain an image of the proper size on the screen 16. The lever 36 is moved to release the brake 35 and the device 33 is turned to move the lens board 17 rapidly up and down until the image on the screen 16 is sharply defined. The lever 36 is then released and the lens board is thereby clamped in proper position. The operator then manipulates the hand wheels 27 and 45 to center the object or objects to be photographed and if the image on the screen 16 is not of proper size the camera frame 7 may be moved vertically and the focusing operation repeated until a satisfactory image is obtained. The camera is now ready for the exposure.

It will be understood from the foregoing that I have perfected a camera of the "shooting down" type in which all of the operating and adjusting mechanism is within easy reach of the operator while he is in position to view the focusing screen and that I have provided means for rapidly moving the lens board to obtain the proper focus in the shortest possible time. My invention, therefore, affords many advantages over cameras of this type heretofore known in which the adjusting mechanism has not been disposed, as in my device, within easy reach of the operator and in which the rapid focusing feature has been absent.

It will be apparent that various changes may be made in the form, construction and arrangement of the parts without departing from the spirit and scope of the invention, or sacrificing any of its material advantages, the form hereinbefore described being merely a preferred embodiment thereof.

I claim:

1. In a device of the character described, the combination of a vertically disposed camera comprising a frame, a lens board movable with respect thereto and connecting means therebetween, a shaft, resilient means between said shaft and said frame to counter-balance the weight of said lens board and connecting means, drums on said shaft, means disposed between said drums and said lens board and adapted when said shaft is rotated to draw said lens board upwardly, hand operating means secured to said shaft and means for automatically locking said shaft.

2. In a device of the character described, the combination of a vertically movable camera, an article supporting screen movably mounted beneath said camera, a slidably mounted hand wheel movable vertically with said camera and disposed to be always readily accessible by the operator when in focusing position, and connecting means between said hand wheel and said supporting screen, whereby the latter is moved horizontally relatively to the camera.

3. In a device of the character described, the combination of a vertical support, a supporting frame movably mounted thereon, a camera mounted on said frame, an article supporting screen disposed beneath the camera, and means, disposed to be always readily accessible by the operator when in focusing position, to move said camera and supporting screen horizontally in directions at right angles to each other.

4. In a device of the character described, the combination of a vertical support, a supporting frame mounted thereon and vertically movable with respect thereto, a counter-weight, flexible means connecting said supporting frame and said counter-weight, a vertically disposed camera slidably mounted to move horizontally on said supporting frame and comprising a frame, a lens board and connection means therebetween, means for moving said lens board toward said camera frame, and resilient means for counter-balancing the weight of said lens board and connecting means.

5. In a device of the character described, the combination of a vertical support, a supporting frame mounted thereon and vertically movable with respect thereto, a counter-weight, flexible means connecting said supporting frame and counter-weight, a vertically disposed camera slidably mounted to move horizontally on said supporting frame and comprising a frame, a lens board and connecting means therebetween, means for counter-balancing the weight of said lens board, means for moving said lens board toward said frame, and a hand operating device for actuating said moving means.

6. In a device of the character described, the combination of a vertically disposed camera comprising a frame, a lens board movable with respect thereto and connecting means therebetween, means for moving said lens board toward said frame, a hand operating device for actuating said moving means, and means for automatically locking said moving means.

7. In a device of the character described, the combination of a vertically disposed camera comprising a frame, a lens board movable with respect thereto and connecting means therebetween, means for moving said lens board toward said frame, a hand operating device for actuating said moving means, and spring-controlled means for automatically locking said moving means.

8. In a device of the character described, the combination of a vertically disposed camera, comprising a frame, a lens board movable with respect thereto and connecting means therebetween, means for moving said lens board toward said frame, a hand-operating device for actuating said moving means, and a spring-controlled brake for automatically locking said moving means.

9. In a device of the character described, the combination of supporting means, a vertically disposed camera, an article supporting screen, and means disposed to be always readily accessible to the operator when in focusing position to adjust said camera vertically and horizontally with respect to said support and to adjust said article supporting screen horizontally with respect to said camera.

10. In a device of the character described, the combination of a vertically disposed camera provided with a movable lens board, an article supporting screen, and means disposed to be always readily accessible to the operator when in focusing position to adjust said lens board to properly focus the camera and to adjust said article supporting screen horizontally with respect to said camera.

11. In a device of the character described, the combination of supporting means, a vertically disposed camera comprising a frame, a lens board movable with respect thereto and connecting means therebetween, means for moving said lens board toward said frame, means for counter-balancing the weight of said lens board and connecting means, and means disposed to be always readily accessible to the operator when in focusing position to adjust said camera vertically and horizontally with respect to said supporting means.

12. In a device of the character described, the combination of supporting means, a vertically disposed camera, comprising a frame, a lens board movable with respect thereto and connecting means therebetween, means for moving said lens board toward said frame, resilient means for counter-balancing the weight of said lens board and connecting means, and means disposed to be always readily accessible to the operator when in focusing position to adjust said camera vertically and horizontally with respect to said supporting means.

13. In a device of the character described, the combination of supporting means, a vertically disposed camera, comprising a frame, a lens board movable with respect thereto, a flexible connecting means therebetween, means for moving said lens board toward said frame, a hand-operated device for actuating said moving means, and means disposed to be always readily accessible to the operator when in focusing position to adjust said camera vertically and horizontally with respect to said supporting means.

14. In a device of the character described, the combination of supporting means, a vertically disposed camera, comprising a frame, a lens board movable with respect thereto and connecting means therebetween, means for counter-balancing the weight of said lens board and connecting means, means for moving said lens board toward said frame, a hand-operating device for actuating said moving means, and means disposed to be always readily accessible to the operator when in focusing position to adjust said camera vertically and horizontally with respect to said supporting means.

15. In a device of the character described, the combination of supporting means, a vertically disposed camera, comprising a frame, a lens board movable with respect thereto and connecting means therebetween, a shaft, drums thereon, means disposed between said drums and said lens board and adapted when said shaft is rotated to draw said lens board upwardly, hand operating means secured to said shaft, and means disposed to be always readily accessible to the operator when in focusing position to adjust said camera vertically and horizontally with respect to said supporting means.

16. In a device of the character described, the combination of supporting means, a vertically disposed camera, and means disposed to be always readily accessible to the operator when in focusing position to adjust said camera vertically and horizontally with respect to said support.

JOHN E. WEBSTER.

Witnesses:
 W<small>M</small>. O. B<small>ELT</small>,
 M. A. K<small>IDDIE</small>.